(12) United States Patent
Ihle et al.

(10) Patent No.: US 7,907,623 B2
(45) Date of Patent: Mar. 15, 2011

(54) GATEWAY FOR AUTOMATICALLY ROUTING MESSAGES BETWEEN BUSES

(75) Inventors: Markus Ihle, Jettenburg (DE); Tobias Lorenz, Schwieberdingen (DE); Jan Taube, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 12/279,463

(22) PCT Filed: Feb. 7, 2007

(86) PCT No.: PCT/EP2007/051180
§ 371 (c)(1),
(2), (4) Date: Jan. 28, 2009

(87) PCT Pub. No.: WO2007/093546
PCT Pub. Date: Aug. 23, 2007

(65) Prior Publication Data
US 2009/0225766 A1    Sep. 10, 2009

(30) Foreign Application Priority Data

Feb. 14, 2006  (DE) .......................... 10 2006 006 926
Jan. 5, 2007   (DE) .......................... 10 2007 001 137

(51) Int. Cl.
H04L 12/28  (2006.01)
H04L 12/56  (2006.01)
G01M 17/00  (2006.01)

(52) U.S. Cl. ........................................ 370/402; 701/29
(58) Field of Classification Search .................. 370/401, 370/402; 701/1, 29
See application file for complete search history.

(56) References Cited

U.S. PATENT DOCUMENTS

2001/0047228 A1* 11/2001 Froeschl et al. ................. 701/1
2004/0015680 A1*  1/2004 Matsuo ......................... 712/226

OTHER PUBLICATIONS

International Search Report, PCT/EP2007/051180, dated Aug. 14, 2007.
Ryan et al., "Clock Synchronisation on Multiple TTCAN Network Channels," Microprocessor and Microsystems, IPC Business Press Ltd., London, GB, vol. 28, No. 3, Apr. 23, 2004, pp. 135 to 146, XP004502590, ISSN: 0141-9331, p. 138.

* cited by examiner

Primary Examiner — Ronald Abelson
(74) Attorney, Agent, or Firm — Kenyon & Kenyon LLP

(57) ABSTRACT

A gateway is provided for automatically routing messages between buses, the gateway being connected to multiple communication components for temporarily storing and transmitting messages via these buses, and having a gateway control unit which is connected to the communication components via a system bus for the exchange of messages, and which receives notification from each communication component of the occurrence therein of a message to be routed as an external event. The gateway control unit has a vector memory which includes a first memory region for storing communication component vectors, a communication component vector being provided for each message group of a communication component, and the vector indicating the point in time of the next expected internal event for a message that is temporarily stored in the communication component, and indicating a vector jump address to a message vector which is stored in a second memory region of the vector memory.

15 Claims, 7 Drawing Sheets

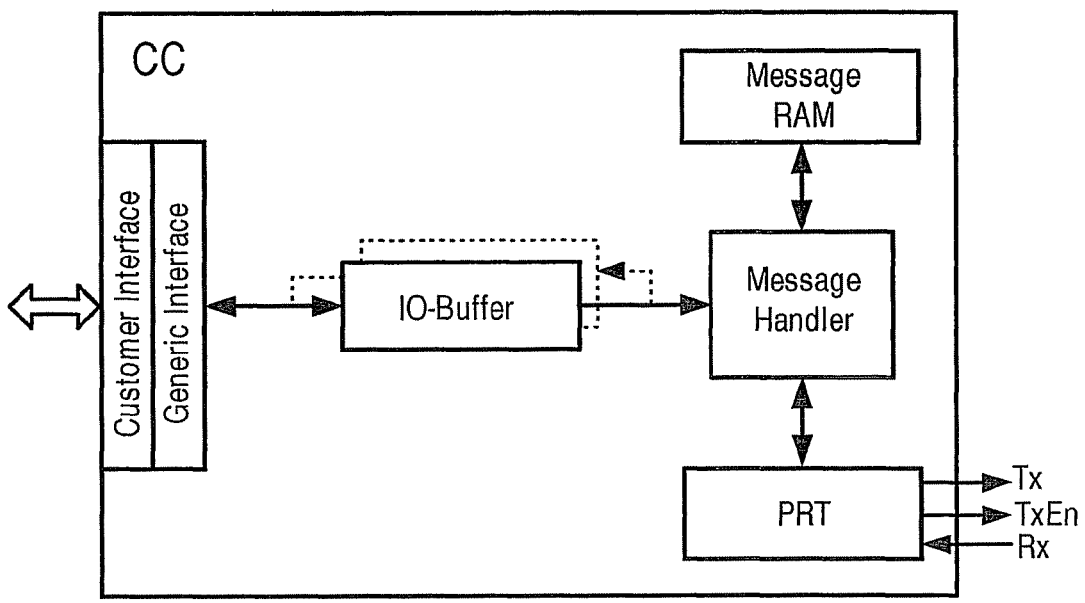
Fig. 1 (Stand der Technik)
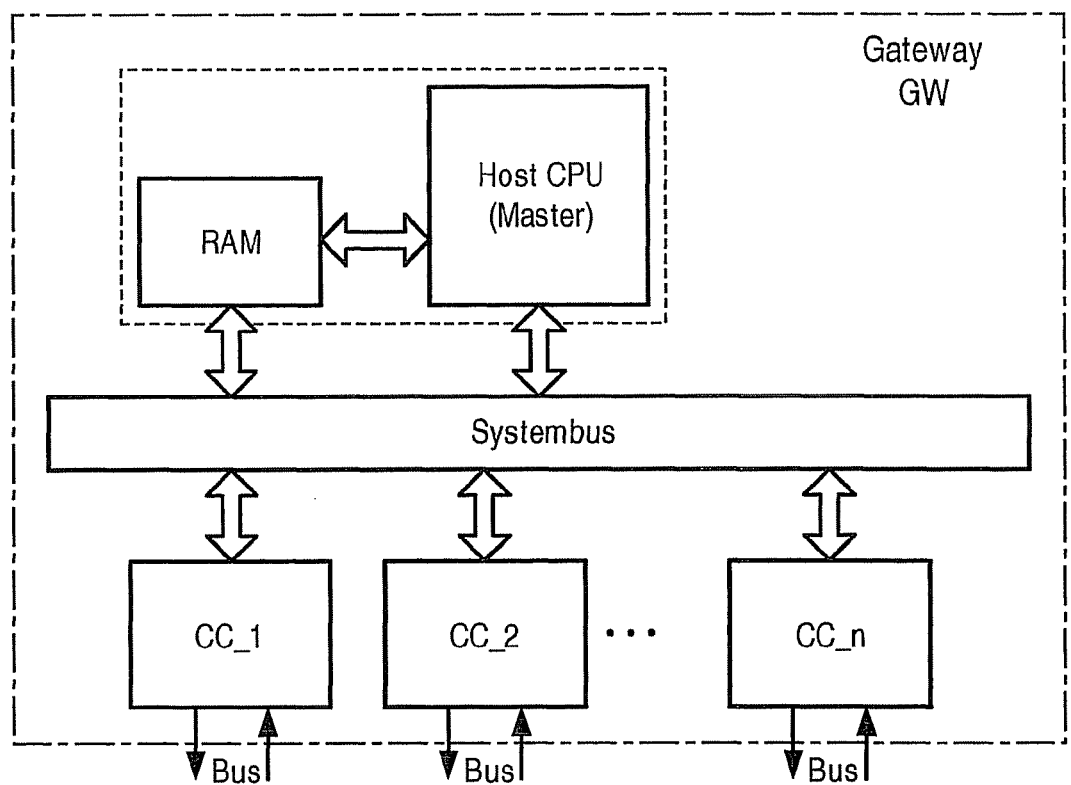
Fig. 2 (Stand der Technik)

GATEWAY FOR AUTOMATICALLY ROUTING MESSAGES BETWEEN BUSES

FIELD OF THE INVENTION

The present invention relates to a gateway for automatically routing messages between buses, in particular between serial buses and field buses.

BACKGROUND INFORMATION

The interconnection of control units, sensor systems, and actuator systems by use of a network or communication system composed of a communication connection, in particular a bus, and corresponding communication components has greatly increased in recent years in the construction of modern motor vehicles, as well as in mechanical engineering, in particular in the area of machine tools, and also in automation. It is possible to achieve synergetic effects by distributing functions over multiple users, in particular control units. These are referred to as distributed systems. Such distributed systems or networks are thus composed of the users and the bus system or multiple bus systems connecting these users. Thus, there is increasingly more communication between various stations or users via such a communication system, bus system, or network, via which the data to be transmitted are conveyed in messages. This communications traffic on the bus system and access and reception mechanisms, as well as error processing, are controlled using a corresponding protocol, the name of the particular protocol (in the present case as well) frequently being used as a synonym for the networks or bus systems themselves.

The controller area network (CAN) bus, for example, has become established as a protocol in the automotive industry. This is an event-controlled protocol; i.e., protocol activities such as transmission of a message are initiated by events which originate outside the communication system. Unambiguous access to the communication system or bus system is achieved via priority-based bit arbitration. A prerequisite is that a priority be assigned to the data to be transmitted, and therefore, to each message. The CAN protocol is very flexible; thus, it is very easy to add additional users and messages, provided that free priorities (message identifiers) are available. The collection of all messages to be transmitted in the network, together with priorities and their transmitting or receiving users or the corresponding communication components, are stored in a list, the so-called communication matrix.

An alternative approach to event-controlled, spontaneous communication is an approach that is a strictly time-controlled approach. All communication activities on the bus are strictly periodic. Protocol activities such as the transmission of a message are triggered only by updating a time period that is valid for the entire bus system. Access to this medium is based on the allocation of time ranges in which a transmitter has an exclusive transmitting right. The message sequence is generally established before startup. Thus, a schedule is generated which meets the requirements for messages with regard to repetition rate, redundancy, deadlines, etc. This is referred to as a so-called bus schedule. TTP/C, for example, is such a bus system.

A combination of the advantages of both referenced types of buses is achieved in the approach of the time-controlled CAN, the so-called time-triggered controller area network (TTCAN). TTCAN meets the above-described requirements for time-controlled communication as well as the requirements for a certain degree of flexibility. TTCAN meets these requirements by establishing the communication cycle in so-called "exclusive time windows" for periodic messages from specific communication users, and in so-called "arbitrating time windows" for spontaneous messages from multiple communication users. TTCAN is based essentially on time-controlled, periodic communication which is clocked by a primary timing user or communication component, the so-called "time master," using a time reference message.

Another possibility for combining various types of transmission is offered by the FlexRay protocol, in which a rapid, deterministic, error-tolerant bus system is provided, in particular for use in a motor vehicle. This protocol operates according to the time division multiple access (TDMA) method, the users, i.e., the messages to be transmitted, being assigned fixed time slots in which they have exclusive access to the communication link (the bus). The time slots are repeated in a fixed cycle, so that the point in time at which a message is transmitted over the bus may be predicted precisely, and the bus access is achieved deterministically. To make optimal use of the bandwidth for the transmission of messages on the bus system, the cycle is divided into a static portion and a dynamic portion. The fixed time slots are located in the static portion, at the start of a bus cycle. In the dynamic portion the time slots are dynamically allocated according to the flexible time division multiple access (FT-DMA) method. In this process the exclusive bus access is permitted in each case for only a brief period. If there is no access, the access is enabled for the next user. This time period is referred as a "minislot," in which waiting takes place for access by the first user.

As described above, there are many different transmission technologies and therefore different types of bus systems or networks. It is often necessary to connect multiple systems of the same type or different types. For this purpose a bus interface unit, a so-called gateway, is used. A gateway is thus an interface between various buses which may be of the same type or different types, the gateway relaying (partial) messages from one bus to one or more other buses. Known gateways are composed of multiple independent communication components, the exchange of messages taking place via the processing interface (CPU interface) of the particular user or the corresponding interface component of the particular communication component. This CPU interface is subjected to heavy load on account of this data exchange and other application functions, in addition to the messages to be transmitted to the user itself, so that, together with the resulting transmission structure, this results in a relatively low data transmission speed, or alternatively, a high clock frequency with high power consumption. There are also integrated communication controllers or communication components which share a common message memory, so-called message RAM, in order to compensate for the structural disadvantages. However, such integrated communication components are therefore very inflexible with regard to data transmission, and in particular are fixed on a specified number of bus connections, usually on the same bus system.

FIG. 1 shows a conventional communication component or communication controller CC for a customary gateway, as illustrated in FIG. 2. Communication component CC has an interface for an internal peripheral bus or system bus for the gateway, and has an additional interface for an external serial bus. The system bus includes an address bus, a data bus, and a control bus, and is used for internal data transmission within the gateway. In addition to the communication component, a host CPU having a data memory RAM as well as other optional components, for example DMA controllers, are connected to the system bus. The host CPU is used for internal data processing, and controls the internal data transfer from one communication component CC to another communication component CC. Communication components CC communicate with the host CPU according to the master-slave principle, communication components representing slave units and the host CPU forming a master unit.

As shown in FIG. 1, the internal interface of communication component CC for the system bus is formed by a two-layer interface, namely, a customer interface and a generic interface. The customer interface connects the system bus to the generic interface, the customer interface being manufacturer-specific and easily exchangeable. The generic interface may be connected to a large number of customer-specific system buses via the customer interface. Communication component CC according to the related art, and as illustrated in FIG. 1, also contains buffer memories for temporarily storing data to be transferred. The buffer memories are formed by RAM registers or data registers, for example. Communication component CC also contains a message forwarding unit, i.e., a message handler, for relaying messages from at least one message memory and one communication protocol unit, as well as buffer memories. The message memory or message RAM temporarily stores the message objects to be transferred, in addition to configuration and status information data. The message forwarding unit controls data flow between all buffer memories, the communication protocol unit, and the temporary message memory. Communication protocol unit (PRT) for conventional communication component CC illustrated in FIG. 1 implements communication according to the data transmission protocol used. Communication protocol unit PRT thus performs the transformation or conversion between the data format of data packets DP transmitted via the external serial bus and messages MSG used within the communication component. Messages MSG relayed by the message forwarding unit or message handler are composed of at least one data word DW, the word length, i.e., the bit number, of data word DW preferably corresponding to the bus width of the internally provided data bus for the gateway. If the system bus has an internal data bus that is 32 bits wide, for example, data word DW likewise has 32 bits. A message MSG may be composed of a predetermined number of data words DW. The storage capacity of a buffer memory corresponds, for example, to the data capacity of a message which contains a predetermined number of data words DW. The arbitration of the data flow is performed by the message forwarding unit or message handler.

A number of serial buses and field buses, for example serial field buses such as a CAN bus, FlexRay bus, MOST bus, or LIN bus, are currently used, in particular in vehicles. During operation, data are exchanged between these serial buses, which may form a part of a network, via a gateway GW.

Depending on the vehicle and the functions performed, the data volume in central gateway GW, as illustrated in FIG. 2, may be very high. This data volume results in a high CPU load; i.e., the CPU is burdened with the routing of data from one serial bus to one or more other serial buses. The CPU load is also increased by operations which are necessary for reducing the bandwidth in individual networks or serial buses, for example, combination of the data contents of multiple messages to form a new message.

In many cases it is necessary to periodically send messages in a specified time frame in order to meet safety requirements. For high-priority messages, it may be necessary to immediately transmit the message without time frames, or outside the time frame. Checking whether a message should be retransmitted, or should not be transmitted due to an error such as a missing message, for example, is likewise performed by the CPU for gateway GW, and consumes processing capacity of the CPU.

In many cases the CPU performs additional functions in parallel; i.e., parallel processes run on the CPU which have a mutually adverse effect and delay the transmission or relaying of a message. As a result of these processes running in parallel, "jitter" as well as latency times for transmission of messages increase, since in many cases it is not possible to interrupt the processes running in parallel.

SUMMARY

Example embodiments of the present invention provide a gateway for automatically routing messages between buses, the gateway relaying messages without influencing the CPU, independently of a CPU load.

An example embodiment of the present invention provides a gateway for automatically routing messages between buses, which includes:

multiple communication components for temporarily storing and transmitting messages N via the buses; and a gateway control unit which is connected to the communication components via a system bus for the exchange of messages N, and which receives from each communication component of the occurrence therein of a message N to be routed as an external event $EV_{ext}$, the gateway control unit having:

a vector memory VRAM having a first memory region for storing communication component vectors KBV, a communication component vector KBV being provided for each communication component which indicates point in time ZP of a next expected internal event EVint for a message N that has been temporarily stored in the communication component and indicates a vector jump address to a message vector NV which is stored in a second memory region of vector memory VRAM, a corresponding message vector NV which has been temporarily stored in the communication component being stored for each relevant message N, the message vector indicating a configurable point in time ZP of an internal event EVint that is to be triggered by associated message N, and indicating an instruction jump address, in addition to other configuration and control data;

an instruction memory IRAM for storing instructions which are addressable using the instruction jump address indicated in message vector NV;

a status register SR which temporarily stores the point in time for the next expected event out of all expected internal events for all messages N temporarily stored in the communication components; and a sequence control system FSM which, when an internal event $EV_{int}$ occurs whose point in time ZP is temporarily stored in a status register SR for all messages N that have been temporarily stored in the communication components, or when sequence control system FSM is notified of the occurrence of an external event $EV_{ext}$ by a communication component, reads communication component vector KBV associated with the particular communication component from the first memory region of vector memory VRAM and uses the vector jump address contained therein to read the instruction jump address of addressed message vector NV from the second memory region of vector memory VRAM, and then reads and executes at least one instruction from instruction memory IRAM using the instruction jump address that has been read, and points in time ZP indicated in vectors NV, KBV are updated.

In an example embodiment of the gateway according to the present invention, the gateway has at least one additional processor which is connected to the communication components via a second, separate system bus.

In an example embodiment of the gateway according to the present invention, the sequence control system for the gateway control unit has an event FSM which evaluates vectors KBV, NV stored in vector memory VRAM when an internal or external event $EV_{ext}$ occurs, and updates the points in time indicated in the vectors, and has an instruction FSM which executes the instructions that have been read from instruction memory IRAM.

In an example embodiment of the gateway according to the present invention, a message vector NV also has a time difference t between the point in time of an internal or external event which is to be triggered by associated message N, and a point in time for next internal event $EV_{int}$ to be triggered by associated message N.

In an example embodiment of the gateway according to the present invention, the gateway control unit has a counter Z as an internal timer for triggering an internal event $EV_{int}$.

In an example embodiment of the gateway according to the present invention, the buses are formed by serial buses.

In an example embodiment of the gateway according to the present invention, each communication component has:
- a communication protocol unit connected to the serial bus for conversion between data packets DP and messages, each of which are composed of multiple data words DW;
- a message forwarding unit for relaying messages between at least one message memory and the communication protocol unit, as well as buffer memories;
- multiple interface units, each connected to an associated system bus of the gateway, each interface unit being connected to at least one associated buffer memory which temporarily stores a message, data words DW being simultaneously transmitted, without a waiting period, to and from the buffer memories of the interface units via multiple system buses and the associated interface units thereof.

In an example embodiment of the gateway according to the present invention, the serial bus is a field bus.

In an example embodiment of the gateway according to the present invention, the field bus is a controller area network (CAN) bus.

In an example embodiment of the gateway according to the present invention, the field bus is a local interconnect network (LIN) bus.

In an example embodiment of the gateway according to the present invention, the field bus is a FlexRay bus.

In an example embodiment of the gateway according to the present invention, the serial bus is an Ethernet bus.

In an example embodiment of the gateway according to the present invention, each of the two system buses has an associated system bus master.

In an example embodiment of the gateway according to the present invention, the message forwarding unit of a communication component signals the receipt of a message transmitted word by word via the system bus to the system bus master of the system bus.

In an example embodiment of the gateway according to the present invention, the message forwarding unit confirms to the system bus master via signals the receipt of a message to be transmitted, after the system bus master has requested the information.

In an example embodiment of the gateway according to the present invention, a message received by the particular system bus and temporarily stored in a buffer memory and relayed by the message forwarding unit to the message memory has at least one flag bit for signaling that it is ready to be transmitted via the serial bus.

Example embodiments of the gateway according to the present invention are described below with reference to the accompanying figures.

BRIEF DESCRIPTION OF THE DRAWINGS

FIG. 1 shows a communication component according to the related art;

FIG. 2 shows a gateway according to the related art;

DETAILED DESCRIPTION

Figure 3:
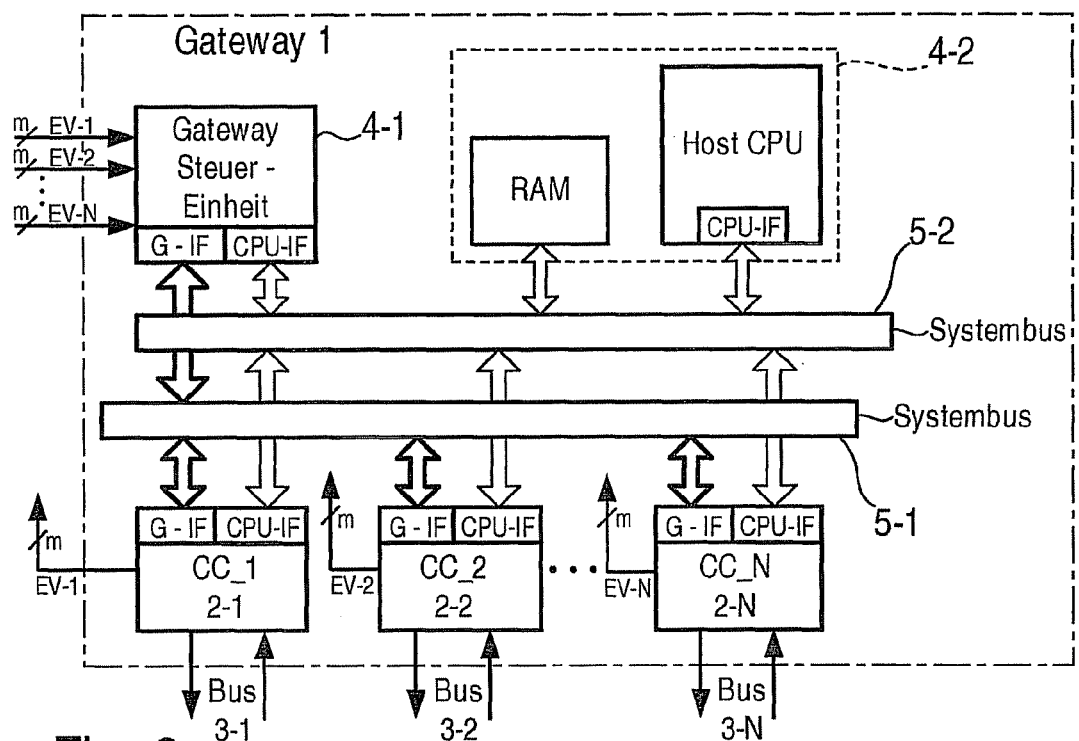
FIG. 3 shows a block diagram of an example embodiment of the gateway according to the present invention.

As shown in FIG. 3, gateway 1 according to an example embodiment of the present invention has multiple communication components 2-i, each of which may be connected to a serial bus 3-i. Serial buses 3-i are field buses or Ethernet buses, for example. Data are transmitted in the form of messages via serial buses 3-i. Transmitted data packets, i.e., messages, include management data and header data as well as useful data, i.e., payload data. According to the example embodiment illustrated in FIG. 3, gateway 1 according to the present invention has multiple master units, a first master unit being formed by a gateway control unit 4-1 and a second master unit being formed by a CPU 4-2. Both master units 4-1, 4-2 perform various functions. In the example embodiment illustrated in FIG. 3, gateway control unit 4-1 is responsible for data transfer between various communication components 2-i. The other master unit, which is formed by a processor 4-2 composed of a host CPU and an internal memory RAM, performs the actual data processing, for example of a control unit function integrated in addition to the gateway. In the example embodiment illustrated in FIG. 3, each master unit 4-1, 4-2 preferably has its own system bus 5-1, 5-2. Each system bus 5-1, 5-2 has its own data bus, address bus, and control bus. In one possible specific embodiment the data are transmitted word by word within gateway 1, the length of a data word DW corresponding to the bus width of the particular data bus of the system bus. In one possible example embodiment, communication components 2-$i$ likewise preferably have an associated interface for each system bus 5-$i$.

Figure 4:
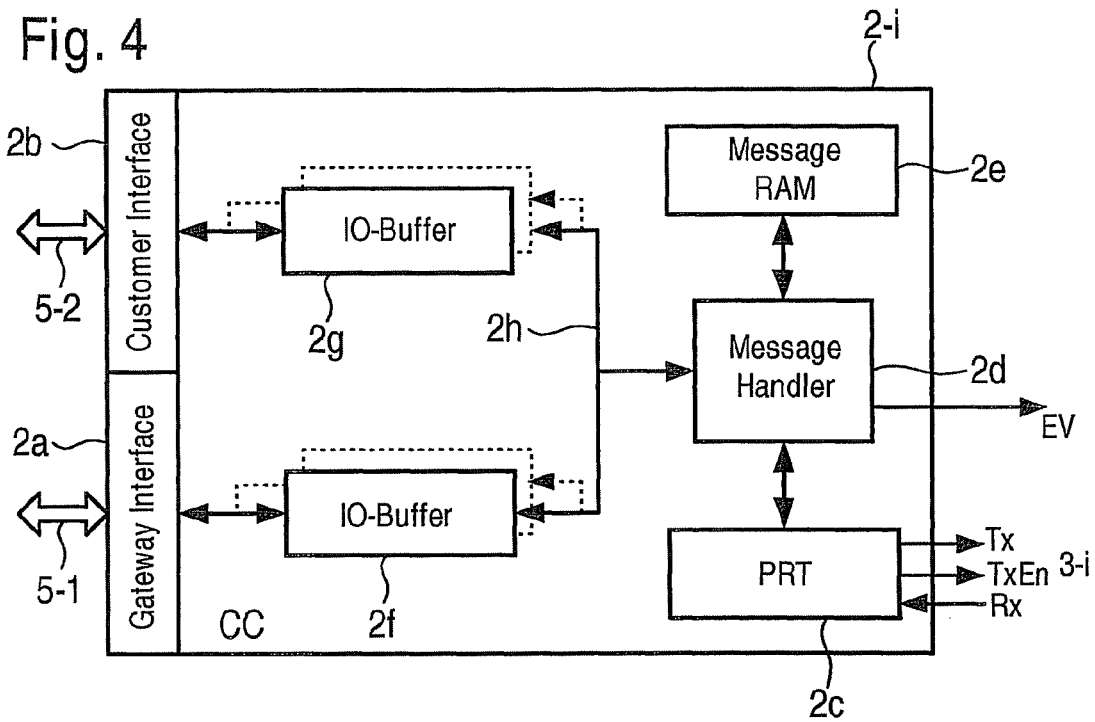
FIG. 4 shows a block diagram of an example embodiment of a communication component within the gateway according to the present invention.

FIG. 4 shows one possible example embodiment of a communication component 2-$i$. Communication component 2-$i$ is used for connecting a serial bus 3 via an interface, communication component 2-$i$ having its own separate interface 2$a$, 2$b$ for each internal system bus 5-$i$ for gateway 1. In the example embodiment illustrated in FIG. 4, communication component 2-$i$ has a first interface 2$a$ for connecting to system bus 5-1, the master unit of which is formed by gateway control unit 4-1. In addition, communication component 2-$i$ has a further interface 2$b$ for connecting to system bus 5-2 for gateway 1, the bus master of which is formed by the host CPU of processor 4-2. A communication protocol unit 2$c$ of communication component 2-$i$ is connected to external serial data bus 3-$i$. Communication protocol unit 2$c$ performs a conversion between data packets, i.e., messages, which are externally transmitted via serial data bus 3-$i$, and with assistance from the message handler internally transmits messages, which in each case may be composed of one or more data words DW.

Communication component 2-$i$ in FIG. 4 also contains a message forwarding unit or message handler 2$d$ for relaying messages between at least one internal message memory or message RAM 2$e$ and communication protocol unit 2$c$, as well as various buffer memories 2$f$, 2$g$, via internal data lines 2$h$. The storage capacity of a buffer memory 2$f$, 2$g$ preferably corresponds to the data volume of a message to be internally transmitted, as well as additional management data. Communication component 2-$i$ has multiple interface units 2$a$, 2$b$, each of which is connected to an associated system bus 5-$i$ of gateway 1. Each interface unit 2$a$, 2$b$ is connected to at least one associated buffer memory 2$f$, 2$g$ in which at least one message or message object MO may be temporarily stored.

Access of gateway control unit 4-1 to a message object MO or message N is achieved via gateway interface 2$a$ and its associated interface register 2$f$. CPU 4-2 has access to messages or customer interface 5-2 and its associated interface register 2$g$. Thus, gateway control unit 4-1 as well as processor unit 4-2 are able to access all messages or message objects without influencing one another.

Figure 5:
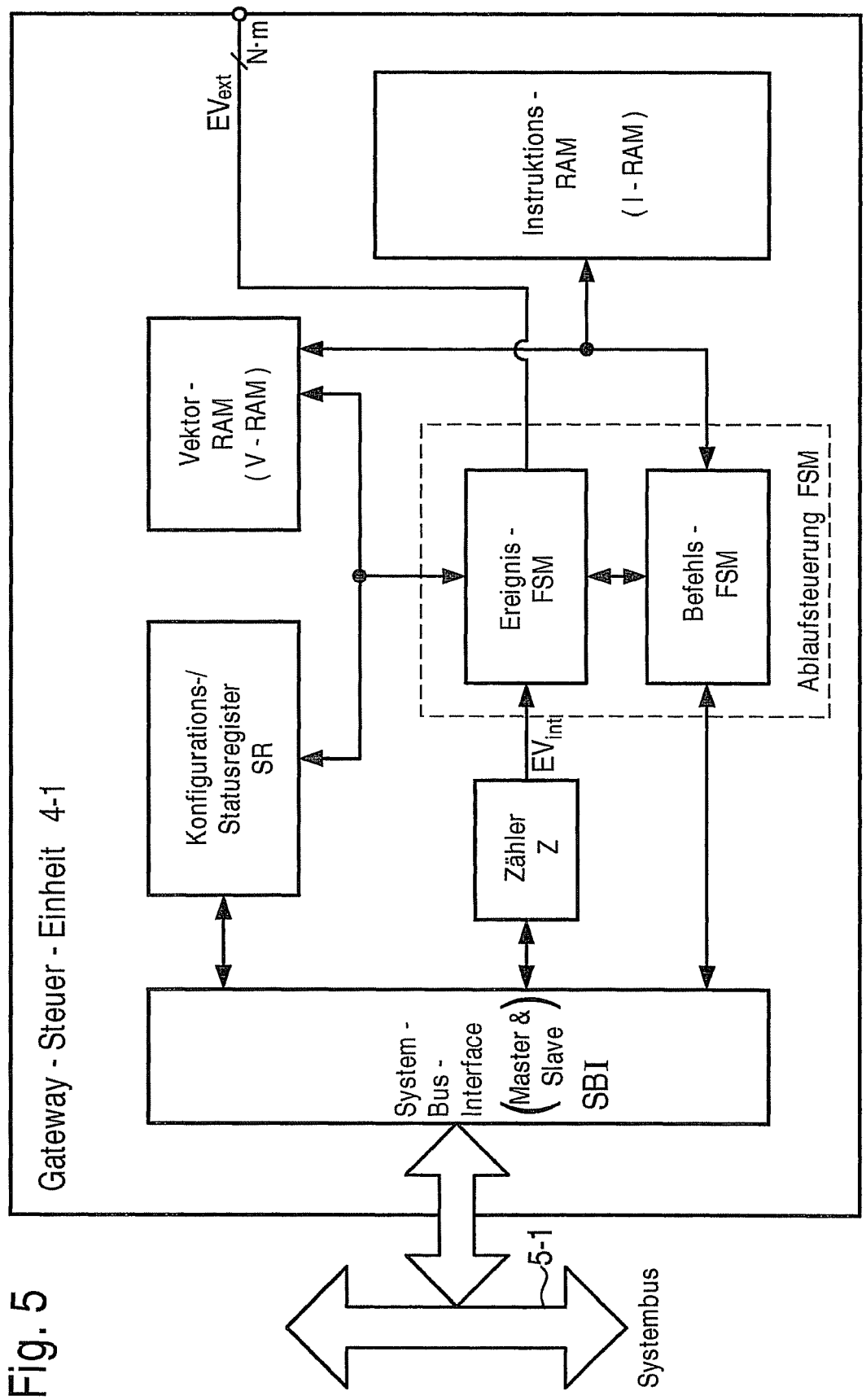
FIG. 5 shows a block diagram of an example embodiment of a gateway control unit contained in the gateway according to the present invention.

FIG. 5 shows one possible example embodiment of a gateway control unit 4-1 contained in gateway 1. Gateway control unit 4-1 is connected via associated system bus 5-1 to communication components 2-$i$ for the exchange of messages. The gateway control unit receives notification from each communication component 2-$i$ of the occurrence therein of a message N or a message object MO to be routed as an external event $EV_{ext}$. As shown in FIG. 3, each communication component 2-$i$ is connected to gateway control unit 4-1 using at least one notification line for notifying of an event. In one possible example embodiment, communication component 2-$i$ illustrated in FIG. 4 has multiple parallel message registers for each interface for storing one message per message register. In one possible example embodiment the messages are divided into multiple groups, for example into m groups. In one possible example embodiment the number of message groups provided within a communication component 2-$i$ is m=4. When an external event $EV_{ext}$ occurs, for example the receipt of a message which is to be relayed, message handler 2$d$ of communication component 2-$i$ notifies gateway control unit 4-1 via a corresponding notification line. In one possible example embodiment, a separate notification line is provided for each group of messages, for example m=4 notification lines. If the number of communication components 2-$i$ is N, assuming that all communication components 2-$i$ have an identical value for N, and the number of groups within communication component 2-$i$ is m, the number of notification lines for external events is N×m.

Figure 6:
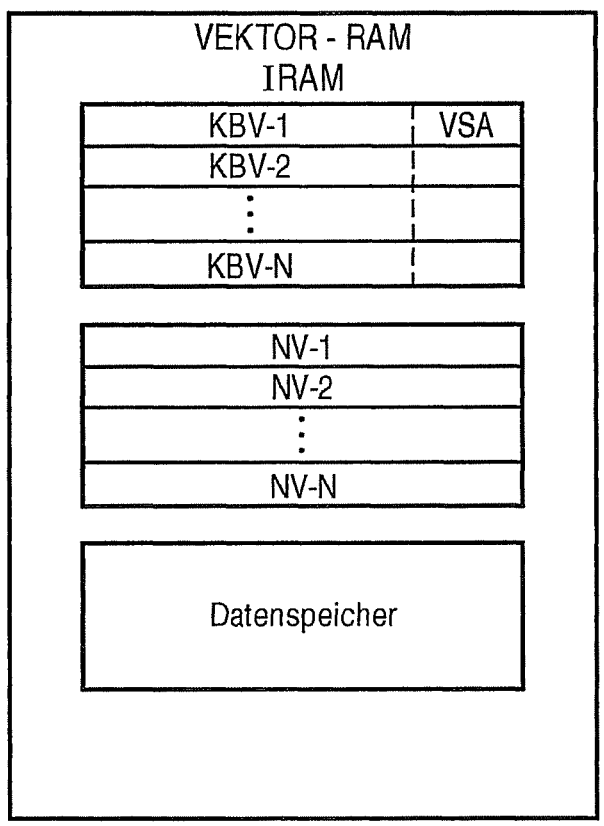
FIG. 6 shows a diagram for illustrating memory contents of a vector memory contained in the gateway according to an example embodiment of the present invention.
Figure 7:
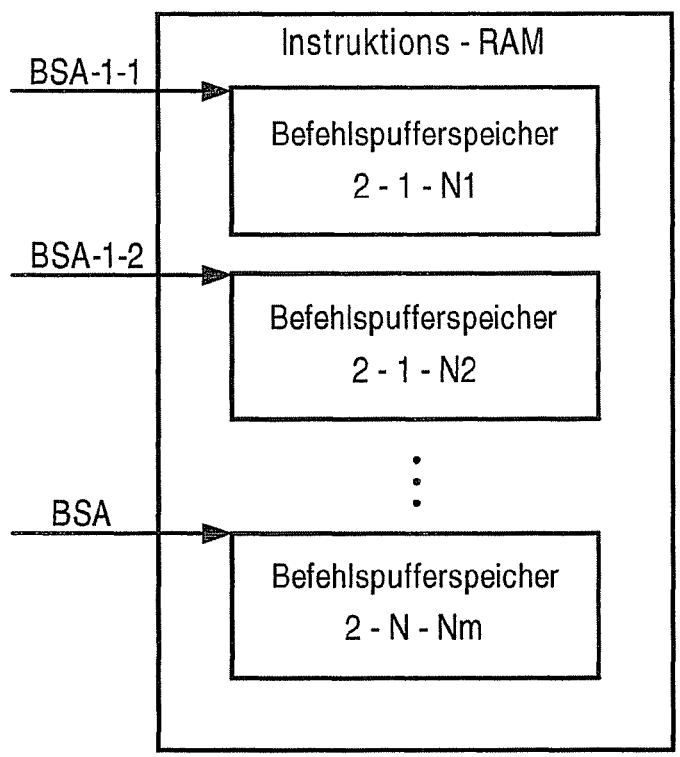
FIG. 7 shows a diagram for illustrating the data content of the instruction memory contained in the gateway according to an example embodiment of the present invention.

As shown in FIG. 5, gateway control unit 4-1 is connected to communication components 2-$i$ via system bus 5-1, and via a notification line receives notification from each communication component 2-$i$ of the occurrence therein of a message to be routed as an external event $EV_{ext}$. Gateway control unit 4-$i$ contains a vector memory VRAM, the memory contents of which are illustrated in FIG. 6. Gateway control unit 4-1 also contains an instruction memory or instruction RAM (IRAM) for storing instructions, the memory contents of which are illustrated in FIG. 7. The central control element of gateway control unit 4-1 is formed by a sequence control system, i.e., a finite state machine (FSM), which is composed of an event FSM and a separate instruction FSM. Gateway control unit 4-1 also contains a status register SR and a counter Z as a timer for triggering internal events $EV_{int}$. Gateway control unit 4-1 is connected to system bus 5-1 via a system bus interface SBI. Vector memory or VRAM, as illustrated in FIG. 6, contains substantially three memory regions. A first memory region contains configuration data for communication components 2; i.e., for each communication component 2-$i$ one communication component vector KBV per message group is stored. For associated communication component 2-$i$, communication component vector KBV stores point in time ZP which indicates the next expected internal event $EV_{int}$ for a message N that has been temporarily stored in communication component 2-$i$. Communication component vector KBV also has a vector jump address VSA on a message vector NV for corresponding message N. In addition, each communication component vector KBV has further configuration data for corresponding communication component 2-$i$. One possible configuration data item is formed by a CC flag, which indicates whether a communication component 2 or a communication controller is activated or deactivated. When communication component 2 has multiple groups of messages N, a communication component vector KBV is provided for each group of messages within communication component 2.

Vector memory VRAM within gateway control unit 4-1 also contains a second memory region in which configuration data are stored as message vectors NV for each message N or each message MSG. A message vector NV is stored in vector memory VRAM for each relevant message N. For each message N temporarily stored in a communication component 2-$i$, a corresponding message vector NV is provided, i.e., stored in VRAM, which indicates a configurable point in time ZP of an internal event $EV_{int}$ to be triggered by associated message N, and also indicates an instruction jump address BSA.

In one possible example embodiment of gateway 1 according to the present invention, message vector NV also has a time difference Δt between point in time ZP of an internal or external event to be triggered by associated message N, and an additional point in time ZP of the next internal event to be triggered by associated message N.

In addition to the memory regions for communication component vectors KBV and the second memory region for message vectors NV, vector memory VRAM has a freely accessible third memory region in which variables are temporarily stored, and in which constants and flags are stored. The freely accessible third memory region of vector memory VRAM is also used for data exchange with CPU 4-2.

Message vectors NV stored in the second memory region of vector memory VRAM have an instruction jump address BSA via which at least one instruction subroutine may be addressed within instruction memory IRAM. For each message N, a message vector NV is stored in the second memory region of vector memory VRAM which in each case has an instruction jump address BSA on a subroutine within instruction memory IRAM. Such an instruction sequence or subroutine is stored in IRAM, a memory region associated with the particular message. The size of the memory region is preferably variable. The position of the memory region within instruction memory IRAM is likewise variable.

In addition to vector memory VRAM and instruction memory IRAM, a sequence control system FSM having an event FSM and an instruction FSM is provided in gateway control unit 4-1. When an internal or external event occurs, event FSM of the sequence control system evaluates the vectors stored in vector memory VRAM, i.e., communication component vectors KBV and message vectors NV, and updates the points in time indicated in the particular vectors.

Gateway control unit 4-1 also has a configuration register or status register SR which, among other functions, temporarily stores point in time ZP for the very next expected event out of all expected internal events $EV_{int}$ for all messages temporarily stored in communication components 2-i.

Instruction FSM within the sequence control system executes the instructions which are read from instruction memory IRAM. Event FSM reads communication component vector KBV associated with particular communication component 2-i from the first memory region of vector memory VRAM when an internal event $EV_{int}$ occurs whose point in time ZP is indicated in a status register SR, or when the sequence control system is notified of the occurrence of an external event $EV_{ext}$ by a communication component 2-i. A communication component vector KBV that has been read contains a vector jump address VSA on a message vector NV in the second memory region of vector memory VRAM. A separate communication component vector KBV is provided for each communication component 2-i or for each group of messages N within a communication component 2-i. The communication component vector forms, in a manner of speaking, a hash table for message vectors NV in the second memory region of vector memory VRAM. Event FSM of the sequence control system uses vector jump address VSA to read addressed message vector NV from the second memory region of vector memory VRAM, and, using instruction jump address BSA contained therein, addresses a subroutine within instruction memory IRAM. The addressed instruction(s) are read from instruction memory IRAM and are processed by instruction FSM within the sequence control system, instruction FSM also updating points in time ZP which are indicated in the vectors, i.e., message vectors NV and communication component vectors KBV, and which correspond to NV and KBV vectors, preferably using event FSM or the processed instructions.

Gateway control unit 4-1 illustrated in FIG. 5 has a counter Z as an internal timer for triggering an internal event.

In gateway control unit 4-1 according to example embodiments of the present invention, a distinction is made between external events $EV_{ext}$ and internal events $EV_{int}$. External events $EV_{ext}$ are triggered by communication components 2-i, in particular when message N or message packet DP to be relayed is received. Internal events $EV_{int}$ are triggered by timer or time counter Z. These internal events are used, for example, for the cyclical transmission of messages, for debouncing received message bursts, or for sending timeout messages when a waiting period has elapsed. In one possible example embodiment of gateway 1 according to the present invention, for each relevant message buffer memory within a communication component 2-i, message vector NV is stored in vector memory VRAM, containing the following information, for example: a reference to the data object or message N to be transmitted, a jump address for executing a given instruction sequence, the next internal event, a time difference for computing the subsequent internal events, and information data for control as well as status information.

Using the data stored in vector memory VRAM, in particular defined points in time ZP, use of counter Z allows practically any time sequence to be implemented by gateway control unit 4-1 according to example embodiments of the present invention in order to transmit data between two or more buses 3 via gateway 1. When the system is started up, timer or counter Z is initialized, and the counter divides the CPU cycle into a time frame that is favorable for the overall system. The instantaneous count value of counter Z is used to check the message objects in communication component vectors KBV and message vectors NV of vector memory VRAM in order to trigger the transmission of a message N. The count value of timer Z is compared to the time values stored in the vector table. If the timer value of counter Z is equal to or greater than the particular stored time value, i.e., point in time, and corresponding message N or the message object is a transmitted object, a jump is made to the indicated address, and the instructions stated at that location are executed. If message N or the message object is a received object, a check is made as to whether the received object would already have to have been received. If the received message object is not received within the expected time, a timeout is triggered by gateway 1 according to the present invention and a corresponding timeout message is transmitted. Time information is then updated by the sequence control system, the computation being based on the previous time information together with the stated cycle times. Using the recomputed points in time, a determination is made concerning when a message N should be retransmitted, or when the next timeout should occur.

When a message N is relayed directly or immediately, it is not necessary to compare the time value indicated by counter Z. Communication component 2-i notifies gateway control unit 4-1 that a message N has been received by communication component 2. Sequence control system FSM then searches in vector memory VRAM for a corresponding entry, i.e., a communication component vector KBV associated with message N. This vector KBV indicates a message vector NV in the second memory region of vector memory VRAM, which contains an instruction jump address BSA for a routine in which the routing instructions are stored.

The automatically running sequence control system, i.e., the finite state machine, performs the evaluation of the time value provided by counter Z in order to compute the new expected time values, i.e., expected points in time ZP, and to actuate various communication components 2-i. With the aid of a counter Z and a status register SR, sequence control system FSM checks all message objects or messages to be transmitted, and also checks the receipt of external new messages N via communication components 2-i. When an internal event occurs, for example the cyclical transmission of a message or an external event, for example the receipt of a message N to be relayed via a communication component 2, the configured routing instructions are executed and various communication components 2 are activated. As a result of connecting communication components 2 via customer interface 5-2, CPU 4-2 in gateway 1 is able at any time to access messages N in communication component or bus modules 2-i. Messages N are preferably temporarily stored in communication component 2-i or in the bus modules of serial buses 3-i, and in one possible example embodiment, for gateway 1 according to the present invention the messages are not loaded in gateway control unit 4-i for automatic routing. In one possible example embodiment of gateway 1 according to the present invention, messages are transferred between communication components or bus modules 2-i via an additional bus, namely, a ring bus, which connects the various communication components to one another in the form of a ring. CPU 4-2 is able via interface register 2g to access all message objects or messages N temporarily stored within a communication component 2-i, while gateway control unit 4-2 gains access via second interface register 2f.

Figure 8:
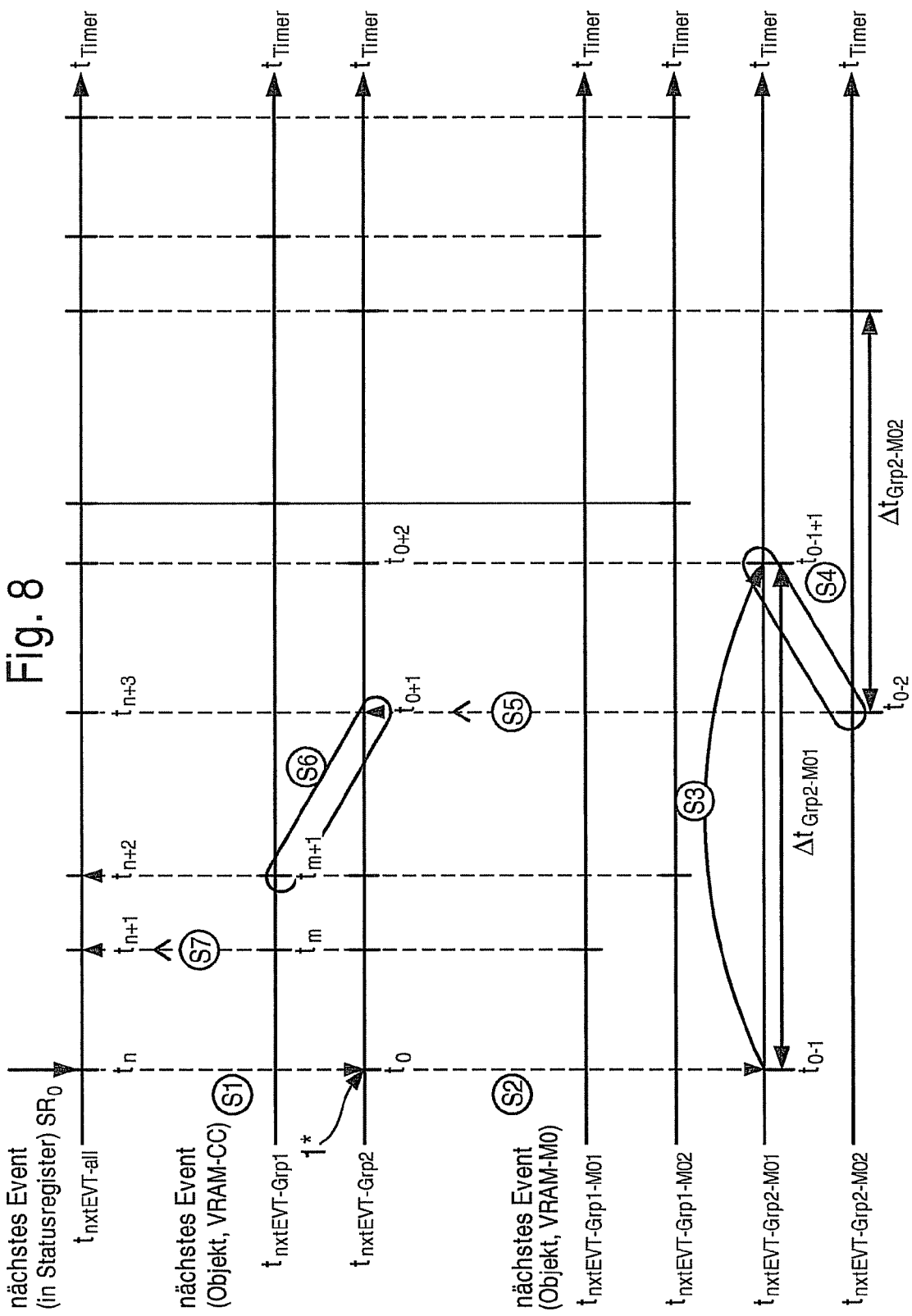
FIG. 8 shows a signal diagram for illustrating one example of message forwarding using the gateway according to an example embodiment of the present invention.

FIG. 8 shows signal sequence diagrams for explaining the mode of operation in one possible example embodiment of gateway 1 according to the present invention. Point in time ZP at which the next expected event, i.e., the very next expected event out of all expected internal events for all messages N temporarily stored in communication component 2-i, occurs is temporarily stored in status register SR of gateway control unit 4-1. Thus, the very next internal event, i.e., the internal event $EV_{int}$ to be expected next by gateway control unit 4-1, is temporarily stored in status register SR. As soon as timer Z provides a count value which indicates the entry of this event ($t_{nxtEvTall} \leq$ TIMER), event FSM determines associated communication components 2-i within the sequence control system and evaluates all communication component vectors KBV stored in vector memory VRAM for the particular group within corresponding communication component 2-i. In the simple example illustrated in FIG. 8, communication component 2 has two messages or message groups, namely, a group GRP1 and a group GRP2. In step S1, event FSM evaluates communication component vector KBV which triggers the time event and which is stored in the first memory region of vector memory VRAM, and in the example illustrated in FIG. 8 event FSM finds communication component vector KBV for second group GRP2 of the messages temporarily stored within communication component 2. In a further step S2, message vector NV which triggers the time event is read and evaluated in the second memory region of second vector memory VRAM. In the example illustrated in FIG. 8, the vector which triggers event EV is the vector of first message N or the message object (message object 1) within second group GRP2 of triggering communication component 2-i.

In a further step S3 the next time event, i.e., the next internal event for this message object MO, is computed:

$$t_{nxtEV+1-Grp_n-MO_m} = t_{nxtEVt-Grp_n-MO_m} + t_{Grp_n-MO_m}$$

This is possible because each message vector NV also has a time difference t between point in time ZP of an internal event to be triggered by associated message N or message object NO and a point in time ZP of the next internal event to be triggered by corresponding message N.

In a further step S4, event FSM searches for the next time event, i.e., next internal event $EV_{int}$:

$$t_{nexEV-GRP_n} = \text{minimum}(t_{nxtEV-GRP_n-MO_m}) : m \in [1 \ldots m_{max}]$$

In a further step S5, using the determined points in time, time information $t_{nxtEV-GRPn}$ is updated in communication component vector KBV within the first memory region of vector memory VRAM.

In a further step S6 the next time event, i.e., the next expected internal event over all groups of stored messages or message objects MO over all communication components 2-i, may be selected. In the example illustrated in FIG. 8 this is point in time $t_m$ for first group GRP1 within the first communication component.

In a subsequent step S7 this point in time $t_m$ is stored in status register SR as point in time $t_{n+1}$, the very next expected internal event. As soon as counter Z reaches this point in time $t_{n+1}$, the process illustrated in FIG. 8 begins anew; i.e., steps S1-S7 are carried out again.

Figure 9:
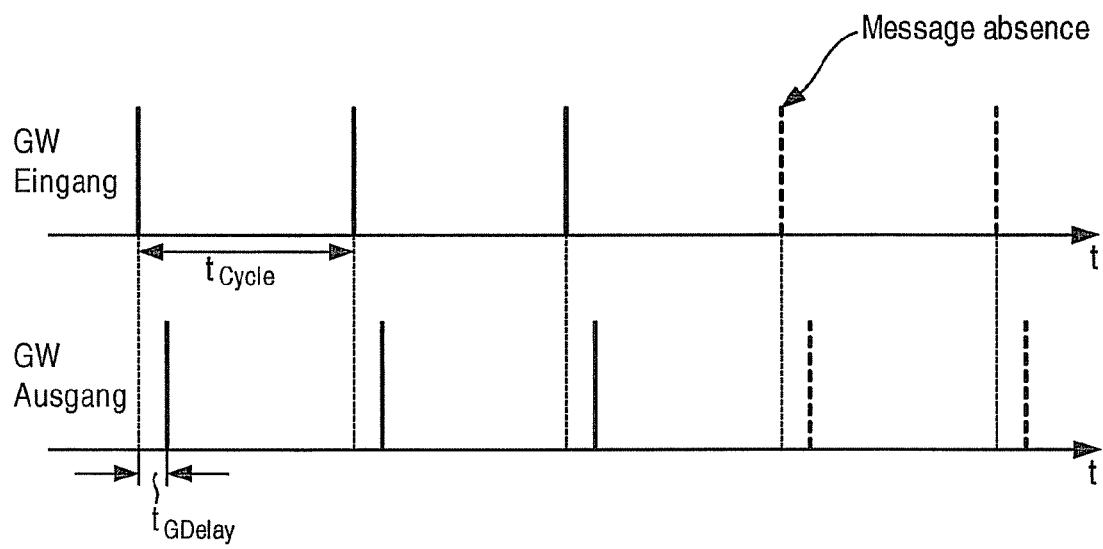
FIG. 9 shows a signal diagram for illustrating a further example of message forwarding using the gateway according to an example embodiment of the present invention.

FIG. 9 shows two time signal diagrams, the upper signal diagram illustrating a message or message object MO arriving at the gateway, and the second, lower time signal diagram showing messages delivered by gateway 1 to another serial bus. In the example illustrated in FIG. 9, a message MO received at a first serial bus 3-i is directly relayed via another serial bus 3-j, with a slight time delay $t_{GD\ delay}$. As shown in FIG. 9, transmission cycle time $t_{cycle}$ is constant; i.e., received message objects N (cyclical or spontaneous) are cyclically relayed.

Figure 10:
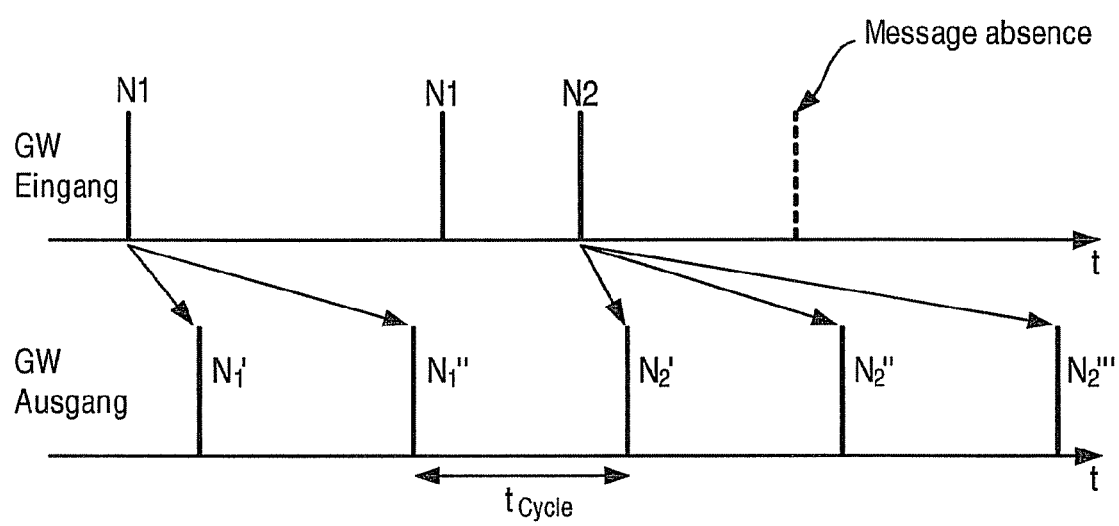
FIG. 10 shows a signal diagram for illustrating a further example of message forwarding using the gateway according to an example embodiment of the present invention.

FIG. 10 shows the cyclical transmission of messages N by gateway 1, even when received message objects N are not cyclically received. The most recently received message $N_i$ is continuously transmitted in a cyclical manner within a constant cycle duration to a bus 3-i.

Figure 11:
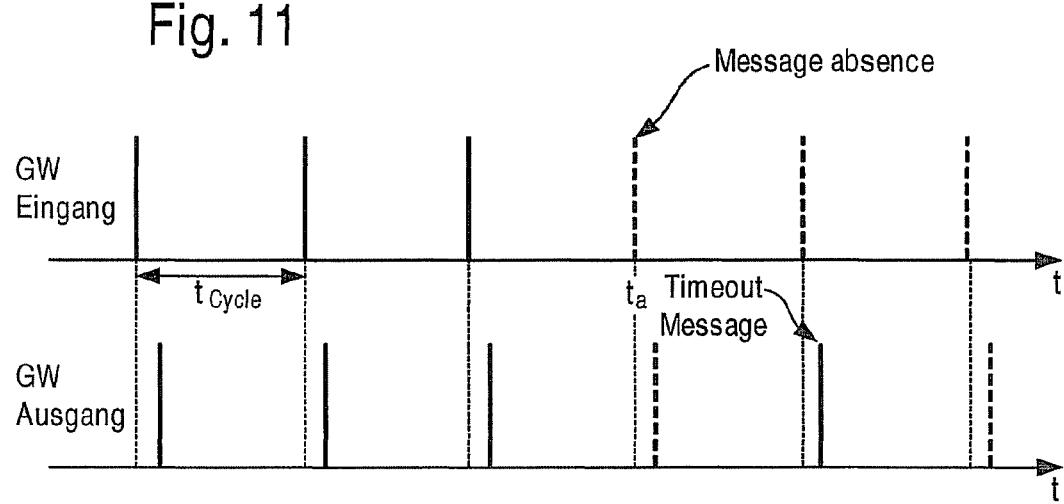
FIG. 11 shows a signal diagram for illustrating a further example of message forwarding using the gateway according to an example embodiment of the present invention.

FIG. 11 shows the direct relaying of a message with timeout; i.e., the absence of an expected message is monitored. As shown in FIG. 11, a message N or message object is received via a first serial bus 3-i and is directly relayed to an output bus. At point in time $t_A$ a determination is made that the expected message has not arrived, and gateway 1 generates a timeout message which is delivered as an outgoing message to the output bus in order to indicate the absence of the expected message. For carrying out the process illustrated in FIG. 11, the sequence control system does not perform the steps illustrated in FIG. 8, namely, step 1 for the receipt of such a message (message properly received in the time frame) and step S3 for the absence of message N (triggering of the timeout), and in each case instead carries out only the remaining steps.

Figure 12:
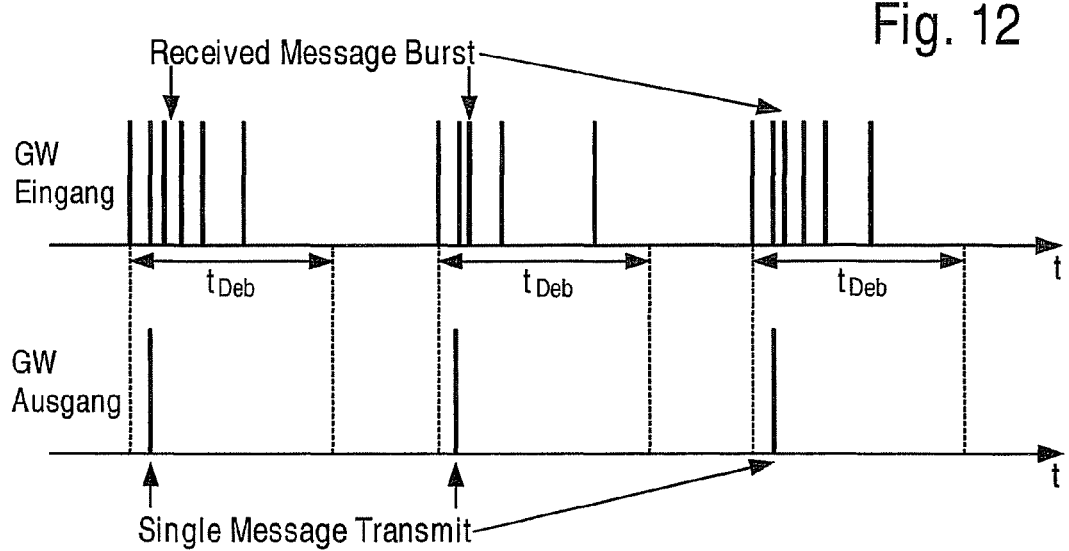
FIG. 12 shows a signal diagram for illustrating a further example of message forwarding using the gateway according to an example embodiment of the present invention.

FIG. 12 shows the debouncing of message bursts. In the example illustrated in FIG. 12, gateway 1 contains multiple messages within a specified window $t_{DEB}$, and relays only the first message in the group to another serial bus 3-i. The remaining messages within the burst are suppressed by gateway 1. In the function or the corresponding operating mode illustrated in FIG. 12, in a first pass a so-called debounce active bit is set as a configuration data item in message vector NV of vector memory VRAM for receipt of a message. As soon as the debounce active bit is set, the process illustrated in FIG. 8 is carried out, step S3 being omitted. Lastly, the debounce active bit is then reset in the configuration data.

As shown in FIGS. 9, 10, 11, and 12, gateway 1 is suitable for various operating modes or functions for relaying or processing messages which are transmitted between various buses 3-i, 3-j. For gateway 1, the CPU load for automatically checking for timeouts and the required transmission of messages or the combination of multiple messages by gateway control unit 4-1 is significantly reduced, depending on the data volume that is present. Transmission of the messages or message objects and checking same for any timeouts is performed by gateway control unit 4-1, independently of processes running at the same time in CPU 4-2. This results in much less jitter and reduced latency times, thus allowing processes in the network to be started and performed more accurately. Each message object or message N may be configured independently of other networks and independently of other message objects in the individual communication components or bus modules. Use of the reference technique employed in gateway 1, using vectors, results in particularly high flexibility in the configurability of gateway 1. The formation of groups of storable messages N within each communication component 2 allows additional nesting, thereby further increasing the flexibility. In addition, the speed of search processes for messages to be processed is significantly increased, and due to the compact definition of a communication process the memory requirements for all message objects are minimized. Gateway 1 opens the possibility for external events to determine or control the time sequence of internal events. Gateway 1 automatically transmits data between field buses or serial buses 3 without burdening CPU 4-2. This allows periodic transmission within a specified time frame, immediate transfer after receiving a message, checking for absence of a message, and debouncing of messages. Messages N are transferred without direct control by the CPU. However, CPU 4-2 has access at all times to the relayed or used message objects without interrupting the automatic routing of the messages. With gateway 1, the message objects or messages N are transferred or relayed independently of software latency times and the instantaneous load on CPU 4-2.

What is claimed is:

1. A gateway for automatically routing messages between buses, comprising:
   (a) multiple communication components configured to temporarily store and transmit messages via the buses; and
   (b) a gateway control unit connected to the communication components via a system bus to exchange messages, the gateway control unit configured to receive notification from each communication component of an occurrence therein of a message to be routed as an external event, the gateway control unit including:
   (b1) a vector memory configured to store communication component vectors provided for each communication component, which indicates a point in time of a next expected internal event for a message and indicates a vector jump address to a message vector which indicates a configurable point in time of an internal event that is to be triggered by an associated message and indicates an instruction jump address;
   (b2) a memory configured to store instructions which are addressable using the instruction jump address indicated in the message vector; and
   (b3) a sequence control system which, at least one of (a) when an internal event occurs whose point in time in a message vector and (b) when an external event occurs, is configured to read the communication component vector associated with the particular communication component from the vector memory and to use the vector jump address contained therein to read the instruction jump address of the addressed message vector, and then to read and execute at least one instruction from the instruction memory using the instruction jump address that has been read, and the points in time indicated in the vectors are updated.

2. The gateway according to claim 1, further comprising a processor connected to the communication components via a second, separate system bus.

3. The gateway according to claim 1, wherein a sequence control system for the gateway control unit includes:
   an event finite state machine configured to evaluate the vectors stored in the vector memory when at least one of (a) an internal and (b) an external event occurs and to update the points in time indicated in the vectors; and
   an instruction finite state machine configured to execute the instructions read from the instruction memory.

4. The gateway according to claim 1, wherein the message vector includes a time difference between the point in time of an internal event which is to be triggered by the associated message and a point in time for a next internal event to be triggered by the associated message.

5. The gateway according to claim 1, wherein the gateway control unit includes a counter as an internal timer for triggering an internal event.

6. The gateway according to claim 1, wherein the gateway control unit includes a status register configured to temporarily store the point in time for a next expected event out of all expected internal events for all messages temporarily stored in the communication components.

7. The gateway according to claim 1, wherein the buses are arranged as serial buses.

8. The gateway according to claim 2, wherein each communication component includes:
   a communication protocol unit connected to the serial bus for conversion between data packets and messages, each of which is composed of multiple data words;
   a message forwarding unit configured to relay messages between at least one message memory and the communication protocol unit, as well as buffer memories;
   multiple interface units, each connected to an associated system bus for the gateway,
   each interface unit being connected to at least one associated buffer memory configured to temporarily store a message;
   data words being simultaneously transmitted, without a waiting period, to and from the buffer memories of the interface units via multiple system buses and the associated interface units thereof.

9. The gateway according to claim 7, wherein the serial bus is arranged as a field bus.

10. The gateway according to claim 9, wherein the field bus is arranged as a controller area network bus.

11. The gateway according to claim 9, wherein the serial bus is arranged as an Ethernet bus.

12. The gateway according to claim 2, wherein each of the two system buses includes an associated system bus master.

13. The gateway according to claim 8, wherein the message forwarding unit of a communication component is configured to signal receipt of a message transmitted word by word via a system bus to a system bus master of the system bus.

14. The gateway according to claim 8, wherein the message forwarding unit of a communication component is configured to confirm to a system bus master via signals a receipt of a message to be transmitted, after the system bus master has requested the information.

15. The gateway according to claim 8, wherein a message received by the particular system bus and temporarily stored in a buffer memory and relayed by the message forwarding unit to the message memory includes at least one flag bit for signaling that it is ready to be transmitted via the serial bus.

* * * * *